(12) United States Patent
Fielding et al.

(10) Patent No.: US 8,256,270 B2
(45) Date of Patent: Sep. 4, 2012

(54) PIPELINE PRESSURE TOOL

(75) Inventors: Brian J Fielding, Luanda (AO); David B Yost, Sinnamon Park (AU)

(73) Assignee: ExxonMobil Upstream Research Company, Houston, TX (US)

( * ) Notice: Subject to any disclaimer, the term of this patent is extended or adjusted under 35 U.S.C. 154(b) by 936 days.

(21) Appl. No.: 11/887,299

(22) PCT Filed: Feb. 8, 2006

(86) PCT No.: PCT/US2006/004574
§ 371 (c)(1),
(2), (4) Date: Dec. 11, 2008

(87) PCT Pub. No.: WO2006/112920
PCT Pub. Date: Oct. 26, 2006

(65) Prior Publication Data
US 2009/0193877 A1    Aug. 6, 2009

Related U.S. Application Data

(60) Provisional application No. 60/671,218, filed on Apr. 14, 2005.

(51) Int. Cl.
*G01M 3/04* (2006.01)
(52) U.S. Cl. .......................... 73/49.5; 73/49.1
(58) Field of Classification Search .................. 73/49.5, 73/49.1, 40.5 R
See application file for complete search history.

(56) References Cited

U.S. PATENT DOCUMENTS

| | | |
|---|---|---|
| 3,726,319 A | 4/1973 | Patterson |
| 3,978,678 A | 9/1976 | Duncan et al. |
| 4,086,806 A | 5/1978 | Covey, III et al. |
| 4,332,277 A | 6/1982 | Adkins et al. |
| 4,429,720 A | 2/1984 | Beck et al. |
| 4,470,946 A | 9/1984 | Vassalotti et al. |
| 4,519,238 A | 5/1985 | Hailey |
| 4,612,961 A | 9/1986 | Vetter |
| 4,643,855 A | 2/1987 | Parkes et al. |
| 4,719,687 A | 1/1988 | Nanny |
| 4,852,393 A | 8/1989 | Pate et al. |

(Continued)

FOREIGN PATENT DOCUMENTS

CA    1312557    6/1991

(Continued)

OTHER PUBLICATIONS

PCT International Search Report relating to PCT/US06/04574 dated Jun. 2000. 4 pages.

(Continued)

*Primary Examiner* — David Rogers
*Assistant Examiner* — Rodney T Frank
(74) *Attorney, Agent, or Firm* — ExxonMobil Upstream Research Company-Law Department (57) ABSTRACT

An apparatus and method for pressure testing one or more sections of a pipeline are provided. In at least one embodiment, the apparatus includes a first high pressure seal and a second high pressure seal adapted to isolate a test volume located within a section of the pipeline between the first and second high pressure seals. The apparatus also includes at least one flexible member connecting the first high pressure seal to the second high pressure seal, the at least one flexible member adapted to permit movement of the first high pressure seal relative to the second high pressure seal, allowing the apparatus to travel through a curvature in the pipeline.

39 Claims, 8 Drawing Sheets

U.S. PATENT DOCUMENTS

| | | | |
|---|---|---|---|
| 4,872,336 | A | 10/1989 | Baillie |
| 4,875,615 | A | 10/1989 | Savard |
| 5,024,079 | A | 6/1991 | Dufort |
| 5,255,559 | A | 10/1993 | Jansch |
| 5,402,828 | A | 4/1995 | Pino |
| 5,797,431 | A | 8/1998 | Adams |
| 5,844,127 | A | 12/1998 | Berube et al. |
| 5,924,454 | A | 7/1999 | Dyck et al. |
| 6,032,515 | A | 3/2000 | Huber |
| 6,082,183 | A | 7/2000 | Huber |
| 6,129,118 | A | 10/2000 | Friedrich et al. |
| 6,131,441 | A | 10/2000 | Berube et al. |
| 6,339,953 | B1 | 1/2002 | Ashworth |
| 6,348,869 | B1 * | 2/2002 | Ashworth ............ 340/605 |
| 6,367,313 | B1 | 4/2002 | Lubyk |
| 6,467,336 | B1 | 10/2002 | Gotowik |
| 6,539,777 | B1 * | 4/2003 | Ashworth et al. ............ 73/49.1 |
| 6,601,437 | B2 | 8/2003 | Gotowik |
| 7,240,697 | B2 * | 7/2007 | Beebe et al. ............ 138/89 |
| 2006/0086400 | A1 * | 4/2006 | Beebe et al. ............ 138/90 |

FOREIGN PATENT DOCUMENTS

| | | |
|---|---|---|
| CN | 2681082 Y | 2/2005 |
| DE | 297 14 238 | 8/1997 |
| EP | 0 147 648 | 7/1985 |
| SU | 845058 | 7/1981 |
| SU | 1562582 A1 | 5/1990 |

OTHER PUBLICATIONS

European Patent Search Report pertaining to 2005UR009 dated Nov. 29, 2005. 4 pages.

English abstract of CN 2681082, Feb. 23, 2005, 1 page.

Zurong, X. et al., "Ultrasonic Smart Pig System for Pipeline", Journal of Beijing Institute of Petro-chemical Technology, Sep. 20, 2004, pp. 19-21, V. 12, No. 3.

Zurong, X. et al., "Ultrasonic Smart Pig System for Pipeline", Journal of Beijing Institute of Petro-chemical Technology, Sep. 20, 2004, p. 22 (English Abstract), V. 12, No. 3.

* cited by examiner

PIPELINE PRESSURE TOOL

CROSS REFERENCE TO RELATED APPLICATIONS

This application is the National Stage of published International Application No. PCT/US2006/004574, filed 8 Feb. 2006, which claims the benefit of U.S. Provisional Patent Application No. 60/671,218 filed on 14 Apr. 2005.

BACKGROUND OF THE INVENTION

1. Field of the Invention

Embodiments of the present invention generally relate to an apparatus and method for isolating and testing one or more sections of pipeline.

2. Description of the Related Art

Once a pipeline is constructed, the pipeline must undergo pressure testing to ensure integrity before put into operation. The pressure test often includes a leak test and a strength test. The section of pipeline to be tested can vary in length, such as between 10 and 50 km, depending on the terrain, locations of pipeline access, and many other factors. Several tests can be performed, section by section, until the integrity of the entire pipeline has been proven.

Current pressure testing procedures use special high pressure test headers that are welded on to each end of the pipeline test section. The pipeline section is then filled with a pressure test medium which can be a liquid or gas. Depending on the diameter of the pipeline and the length of the section(s) to be tested, the volume within the pipeline to be filled with the pressure test medium can be immense.

On large diameter pipes the normal practice is to use water due to the high power demands of compressing large volumes of a gas. In such case, a water source must be found, such as a river or lake, and the water must be delivered to the test header location. Often times the project requires construction of a dedicated water delivery pipeline to meet the required volumetric flow rates. After the pipeline is filled with water, specialized equipment is needed to "squeeze", or pressurize, the line up to the test pressure. Some codes require the pipeline to be pressured up to 125% of the expected operating pressure. The pressure is held for a certain amount of time (usually 4 to 24 hours). If a pressure loss is detected, the leak must be found and repaired, and the entire section must be re-tested. If the pipeline test section is long, locating the leak can be very difficult and time consuming, especially if the pipe is buried.

In freezing conditions, the water may require freeze-depressant additives. The volume of these freeze-depressant additives can often reach 50% of the total test volume, thus requiring the purchase and delivery of large volumes of expensive chemicals. Further, environmental concerns arise due to the presence of the chemicals, especially when a leak may release harmful substances to the environment.

An alternative to using freeze-depressant chemicals is to use large heat exchangers to add thermal energy to the water. The heaters would add enough energy to the water to prevent freezing during the entire time span of the hydrotest. This option can also be very expensive. To achieve uniform temperature distribution across the entire length of the test section, the water is heated and circulated, from entry to exit, several times. This may require heating 5 to 10 times the actual pipe section volume, Heating these volumes of water will consume a large quantity of diesel, thus further increasing power consumption and fuel delivery costs. Additional background can be found in U.S. Pat. No. 6,339,953 to Ashworth, U.S. Pat. No. 4,872,336 to Ballie, U.S. Pat. No. 6,467,336 to Gotowik, DE 297 14 238 U1 to JT-Elektronik GMBH, U.S. Pat. No. 4,429,720 to Beck et al., and EP 0 147 648 A to BBC Aktiengesellschaft Brown, Boveri & Cie.

There is a need, therefore, for a tool and method for pressure testing a pipeline that require a smaller test volume, reduce the need and/or quantity of freeze-depressant additives, and reduce power consumption.

SUMMARY OF THE INVENTION

Embodiments of the present invention provide an apparatus and method for pressure testing one or more sections of a pipeline. In at least one embodiment, the apparatus includes a first high pressure seal and a second high pressure seal adapted to isolate a test volume located within a section of the pipeline between the first and second high pressure seals. The apparatus also includes at least one flexible member connecting the first high pressure seal to the second high pressure seal, the at least one flexible member adapted to permit movement of the first high pressure seal relative to the second high pressure seal, allowing the apparatus to travel through a curvature in the pipeline.

In at least one other embodiment, the apparatus includes a first high pressure seal and a second high pressure seal adapted to isolate a test volume located within a section of the pipeline between the first and second high pressure seals; and at least one articulating member connecting the first high pressure seal to the second high pressure seal, the at least one articulating member adapted to permit movement of the first high pressure seal relative to the second high pressure seal, allowing the apparatus to travel through a curvature in the pipeline.

In yet another embodiment, the apparatus includes a first mechanical seal and a second mechanical seal adapted to isolate a test volume located within a section of the pipeline between the first and second mechanical seals; and at least one flexible member connecting the first mechanical seal to the second mechanical seal, the at least one flexible member adapted to permit movement of the first mechanical seal relative to the second mechanical seal, allowing the apparatus to travel through a curvature in the pipeline.

In yet another embodiment, the apparatus includes a flexible tubular for inserting into an inner diameter of a pipeline to be tested. The flexible tubular member has a first end axially disposed from a second end. The apparatus also includes a first mechanical seal disposed about the first end for engaging an inner diameter of the pipeline at a first location. The apparatus further includes a second mechanical seal disposed about the second end for engaging the inner diameter of the pipeline at a second location. A test volume is defined about an outer diameter of the flexible tubular member, between the first and second mechanical seals.

In at least one embodiment, the method includes positioning a first high pressure seal inside a pipeline at a first location and positioning a second high pressure seal inside the pipeline at a second location, thereby providing a test volume between the first and second seals. The test volume is pressurized thereby providing a pressure difference of 200 psi or greater across at least one of the first high pressure seal, the second high pressure seal or both. Within eight hours of the completion of the positioning step, the first high pressure seal is repositioned at a third location, the second high pressure seal is repositioned at a fourth location, and a second test volume is pressurized between the first and second seals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1A:
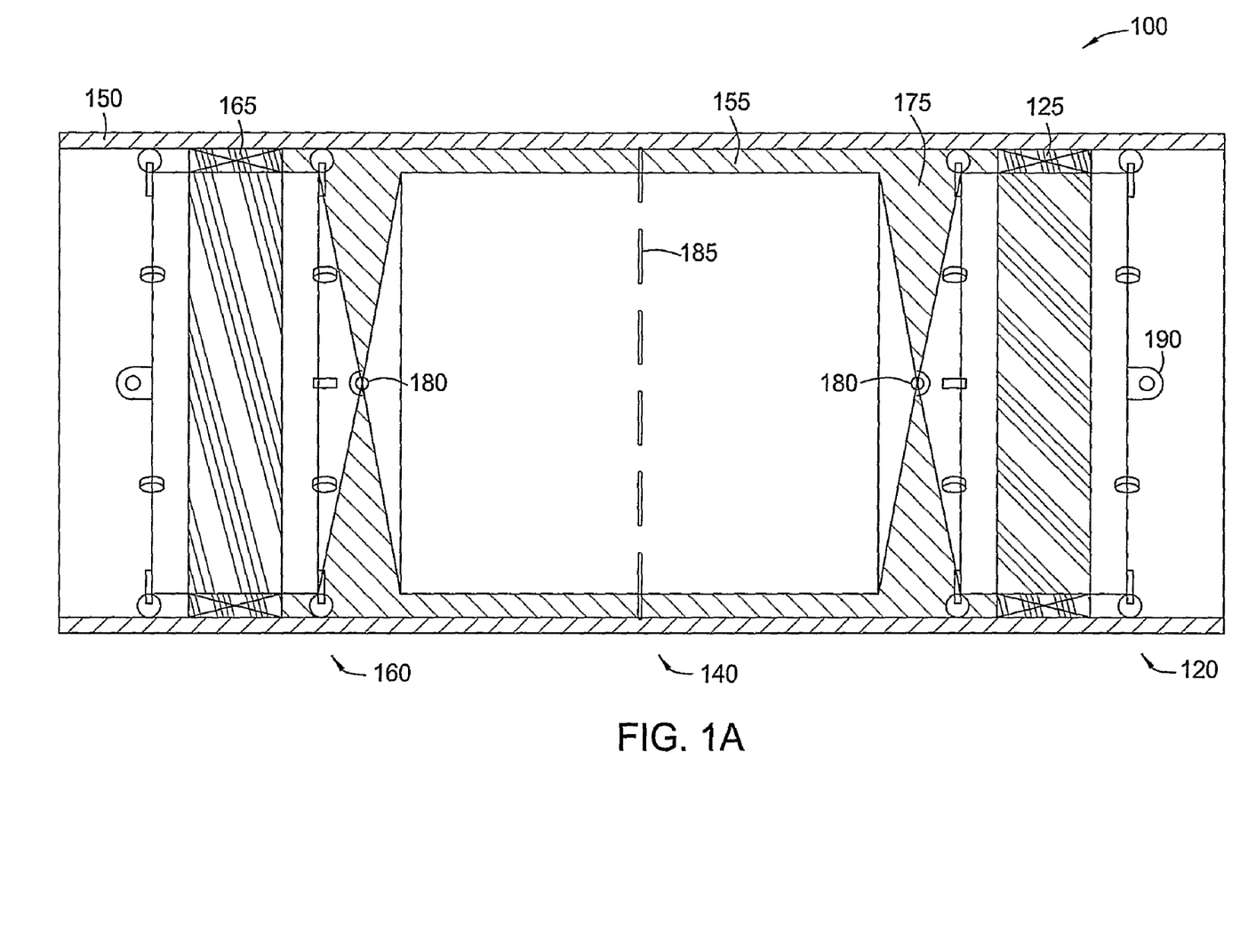
FIG. 1A is a schematic illustration of a tool for pressure testing one or more sections of pipeline according to one or more embodiments described.

FIG. 1A is a schematic illustration of a tool 100 for pressure testing one or more sections of a pipe 150. In one or more embodiments, the tool 100 includes a first section ("first seal assembly") 120, a second section ("body") 140, and a third section ("second seal assembly") 160. Preferably, the second section 140 is disposed between the first seal assembly 120 and the second seal assembly 160 as shown in FIG. 1. The first and second seal assemblies 120, 160 each include one or more sealing elements 125, 165 to isolate the section of pipe 150 to be tested, thereby isolating a test volume 175 within the sealing mechanisms 125, 165.

The cross section profiles of the first, second and third sections 120, 140, 160 can be any shape including, but not limited to, a square, triangle, or circle to match the cross section profile of the pipe 150. For simplicity and ease of the description however, the tool 100 will be described in more detail below with reference to a cylindrical pipeline, such as an underground pipeline for transporting gaseous or liquid hydrocarbons.

Considering the body 140 in more detail, the body 140 can be a hollow or solid tubular. The body 140 is disposed within the test volume 175, thereby reducing the size of the test volume 175. The outer diameter of the body 140 can vary depending on the size of the surrounding pipe 150 to be tested. Preferably, the body 140 has an outer diameter less than the inner diameter of the pipe 150, providing a small annular space ("annulus") 155 between the body 140 and the pipe 150. For example, the annulus 155 between the outer diameter of the body 140 and the inner diameter of the pipe 150 can be less than 30 centimeters (cm), less than 20 cm, less than 10 cm, less than 5 cm, less than 4 cm, less than 3 cm, less than 2 cm, or less than 1 cm.

Accordingly, the size of body 140 can be selected to control the volume or the test volume 175 within the tool 100. The test volume 175 includes the space between the body 140 and the first and second sections 120, 160 as well as the volume of the annulus 155. During the pressure test, only the test volume 175 is filled with fluid and elevated to the required test pressure. By reducing the effective pressure test volume, both the time and power consumption to perform each test is greatly reduced.

Similarly, the length of the body 140 can vary. The length can depend on the desired application. For example, the length can be less than 5 feet to test a single girth weld 185 of one section of pipe. The length of the body also can be longer such up to 100 feet, spanning one or more pipe segments and two or more welds. In one or more embodiments, the length of the body 140 is less than 100 feet, less than 90 feet, less than 80 feet, less than 70 feet, less than 60 feet, less than 50 feet, less than 40 feet, less than 30 feet, less than 20 feet, less than 10 feet, less than 5 feet, less than 3 feet, less than 2 feet, or less than 1 foot. In one or more embodiments, the length of the body 140 ranges from a low of about 1 foot, 4 feet, or 10 feet to high of about 40 feet, 50 feet, or 55 feet. In one or more embodiments, the length of the body 140 ranges from about 4 feet to about 50 feet.

The body 140 can be constructed of any material sufficient to withstand the operating conditions of the hydrotest. In one or more embodiment, the body 140 can be made from steel, carbon steel, stainless steel, nickel alloys, magnesium alloys, titanium, zinc alloys, copper alloys, iron, aluminum alloys, or any combination thereof. In one or more embodiments, the body 140 is flexible to allow the body 140 to bend or flex in response to a curvature of the pipe 150. For example, at least a portion of the body 140 can be corrugated or folded (i.e. accordion pleated), such as a bellows for example. Alternatively, the body 140 can be constructed of a flexible polymeric material. The body 140 also can be constructed from a polymeric material reinforced with a metal or fabric mesh to provide additional strength and stability. In one or more embodiments, the body 140 is constructed from flexible tubing, flexible pipe, coiled tubing, or any combination thereof.

In one or more embodiments, the first and third sections 120, 160 can be disposed on or about the body 140. For example, the first section 120 can be coupled to the body 140 at a first end thereof and the third section 160 can be coupled to the body 140 at a second end thereof. In one or more embodiments, the first, second, and third sections 120, 140, 160 can be connected using one or more flexible connectors 180. As used herein and in the claims, the term "flexible connector" means a device that provides for the connection of two or more items through a joint that provides for relative movement between the two items. Exemplary flexible connectors include bodies made from a flexible material such as plastic or rubber that provide for relative movement between two points on such a body through deformation, stretching or contraction of the body. Exemplary flexible connectors also include articulating connectors.

As used herein and in the claims, the phrase "articulating connector" means a flexible connector that provides for the connection of two or more items and allows for angular movement between the two or more connected items. An articulating connector may provide for angular movement in one or more axes. Alternatively, an articulating connector may provide for angular movement around 360 degrees of one or more axes. Exemplary articulating joints include one or more of a ball-and-socket joint, a universal joint, or a flexible pipe.

In one or more embodiments, the sealing elements 125, 165, can be a high pressure seal. As used herein and in the claims the term "high pressure seal" means a seal or sealing element that is able to isolate a fluid across a pressure difference of about 200 psi or greater. In one or more embodiments, the sealing elements 125, 165, can be expanded to form a high pressure seal with the surrounding pipe 150. For example, air or other fluid can be asserted against a backside of the sealing element 125, 165 to inflate or expand the sealing element 125, 165 radially outward toward the pipe 150.

In one or more embodiments, the sealing elements 125, 165, can be a mechanical seal. As used herein and in the claims, the term "mechanical seal" means a seal or sealing element that is able to isolate a fluid, and the seal is engaged at least partially by action of a mechanical member. Mechanical members can include rigid or semi-rigid members. Preferably, the mechanical seal is able to isolate a fluid across a pressure difference of about 200 psi or greater. In one or more embodiments, the sealing element 125, 165 can be compressed and/or expanded to form a mechanical seal with the surrounding pipe 150 using a cone or wedge system, for example.

In one or more embodiments, either the sealing element 125 or the sealing element 165 can be an expandable, high pressure seal while the other can be a mechanical, high pressure seal. The sealing elements 125, 165 can be constructed from any suitable material capable of withstanding pressure differentials up to 15,000 psi. For example, the sealing elements 125, 165 can be an expansible elastomeric seal. Further, the sealing elements 125, 165 can have any number of configurations to effectively seal against the surrounding pipe 150. For example, the sealing elements 125, 165 can include grooves, ridges, indentations, or protrusions designed to allow the sealing elements 125, 165 to conform to variations in the shape of the interior of the pipe 150.

The flexible connectors 180 allow the tool 180 to twist and/or turn as it navigates though the surrounding pipeline. By doing so, the sealing assemblies 120, 160 can be positioned perpendicular or at least substantially perpendicular to the pipeline centerline. Such an alignment allows for a more efficient seal with the wall of the pipe 150.

Referring to FIG. 1A, the flexible connectors 180 can be one or more articulating joints that provide a connection through a joint that provides for angular movement therebetween, as shown. Suitable articulating joints include but are not limited to ball-and-socket joints and universal joints.

Figure 1B:
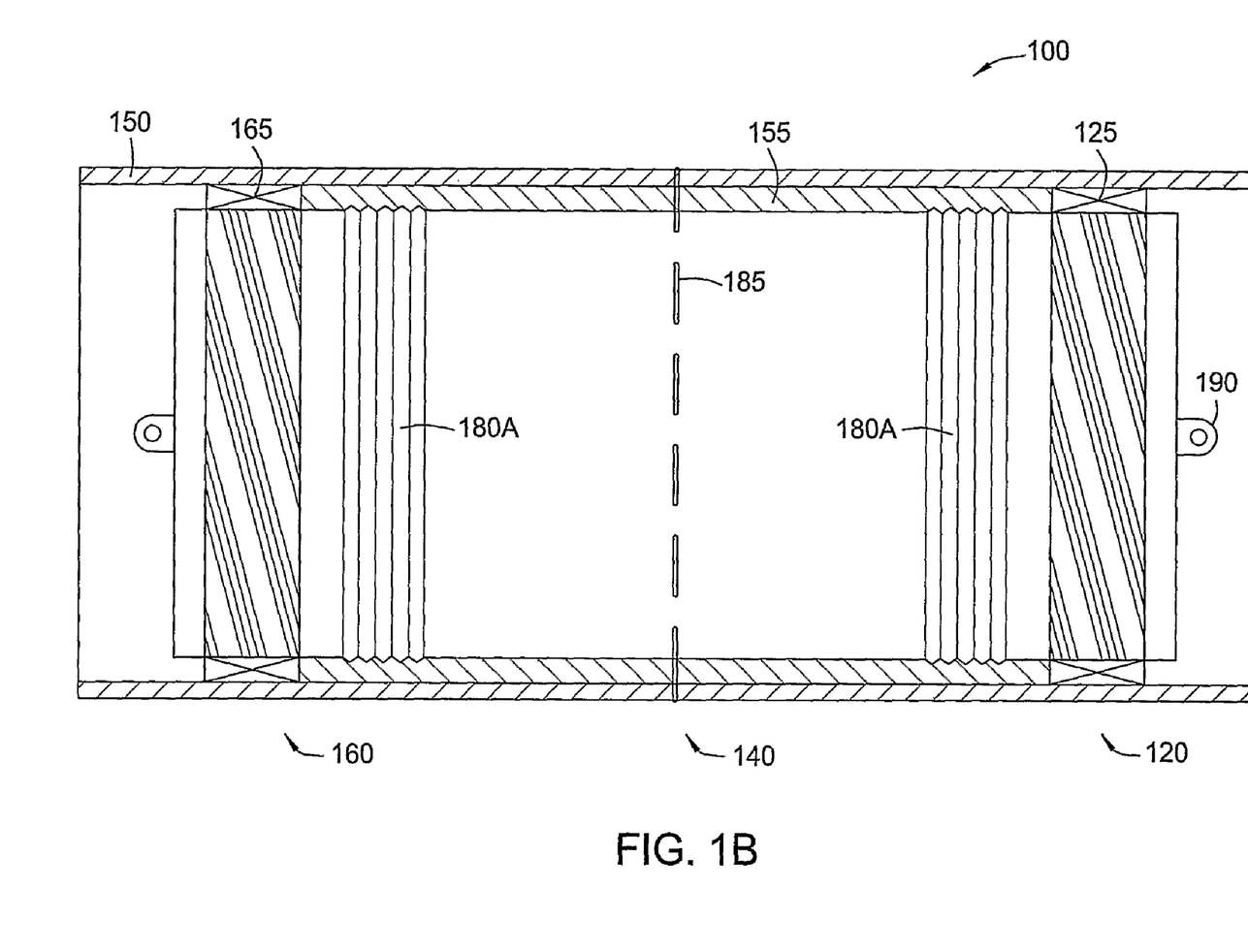
FIG. 1B is a schematic illustration of an alternative embodiment of the tool shown in FIG. 1A.

FIG. 1B is a schematic illustration of an alternative embodiment of the tool 100 shown in FIG. 1A. In this embodiment, the tool 100 utilizes a flexible connector 180A that includes a body made from a flexible material such as plastic or rubber that provides for movement through deformation, stretching or contraction of the body. One illustrative flexible connector 180A is an accordion-type or pleated pipe as shown in FIG. 1B.

In one or more embodiments, any one of the first, second or third sections 120, 140, 160 can include one or more mechanical propulsion ports. Two mechanical propulsion ports 190 are shown, one coupled to the first section 120 and one couple to the third section 160. As used herein and in the claims, the phrase "mechanical propulsion port" means a device that enables the linkage of a mechanical propulsion force to an apparatus. For example, a hitch is an example of a mechanical propulsion device that is suitable for connection to a cable that is driven by a winch to pull the apparatus. For example, a drive shaft fitting is an example of a mechanical propulsion port that is suitable for connection to a drive shaft that is either pushed or pulled by a propulsion device ("motion device") in order to push or pull the apparatus. Other suitable mechanical propulsion ports can include a ball-and-socket joint and a universal joint.

Figure 2:
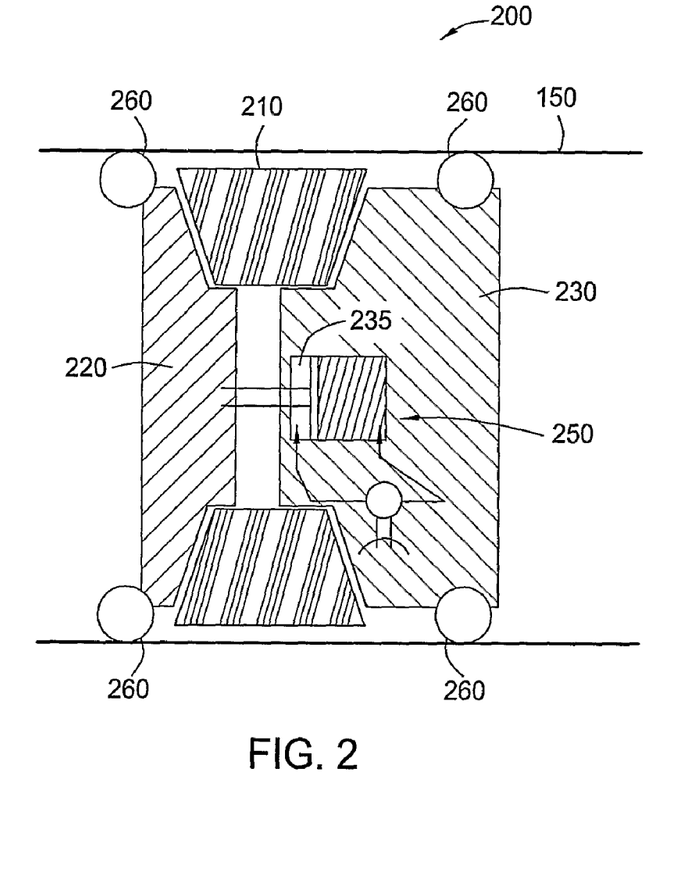
FIG. 2 is a schematic illustration of a seal assembly 200 that can be mechanically actuated ("set") using a cone or wedge system.

FIG. 2 is a schematic illustration of a seal assembly 200 that can be used to form a mechanical seal using a cone or wedge system. The seal assembly can include a sealing element 210 disposed between a cone or wedge 220, and a support ring 230. The sealing element 210 can be similar to the sealing elements 125, 165 described above. The cone 220 can be a solid or annular ring having an inclined ("sloped") surface abutting one side of the sealing member 210. The support ring 230 can also be a solid or annular ring having an inclined ("sloped") surface abutting the opposite side of the sealing element 210.

In one or more embodiments, the seal assembly 200 can include a plurality of roller or coasters 260 to guide and/or stabilize the seal assembly 200 within the pipeline. For example, the seal assembly 200 can include a first set of rollers 260 disposed about a first end of the cone 210 and a second set of rollers 260 disposed about a first end of the support ring 220 as shown in FIG. 2. Each set of rollers can include three or more rollers (only two are shown in this view) equally spaced about the circumference of the tool 100 to evenly distribute the weight of the tool 100.

The seal assembly 200 can be actuated or set using one or more actuating members 250. Preferably, the actuating member 250 is a piston 235. The piston 235 can be electrically, hydraulically or pneumatically actuated. For example, the piston 235 can be hydraulically actuated using a fluid, either gas or liquid, supplied through a conduit (not shown) in fluid communication with a source of hydraulic fluid located inside or outside the pipeline. Additional details are discussed below.

Figure 3:
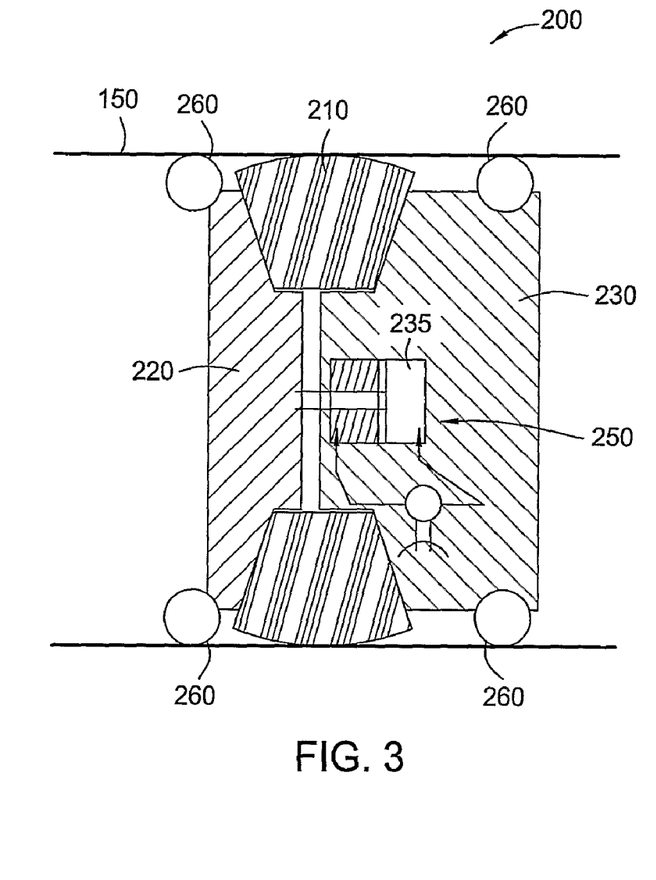
FIG. 3 is a schematic illustration of the seal assembly 200 of FIG. 2 after the seal assembly 200 is actuated or set within the pipe 150.

FIG. 3 is a schematic illustration of the seal assembly 200 after the seal assembly 200 is actuated ("set") within the pipe 150. As shown, the piston 235 is actuated to move the cone 220 toward the sealing element 210 thereby compressing or squeezing the sealing element 210 against the sloped end of the support ring 230. The sealing element 210 is therefore compressed axially and expanded radially to engage the surrounding pipe 150. After testing a section of pipe 150, the piston 150 can be released or deactuated to release the cone 220 and release the sealing element 210 from the pipe 150. The tool 100 can then be located at another section of pipe 150 to be tested.

Figure 4A:
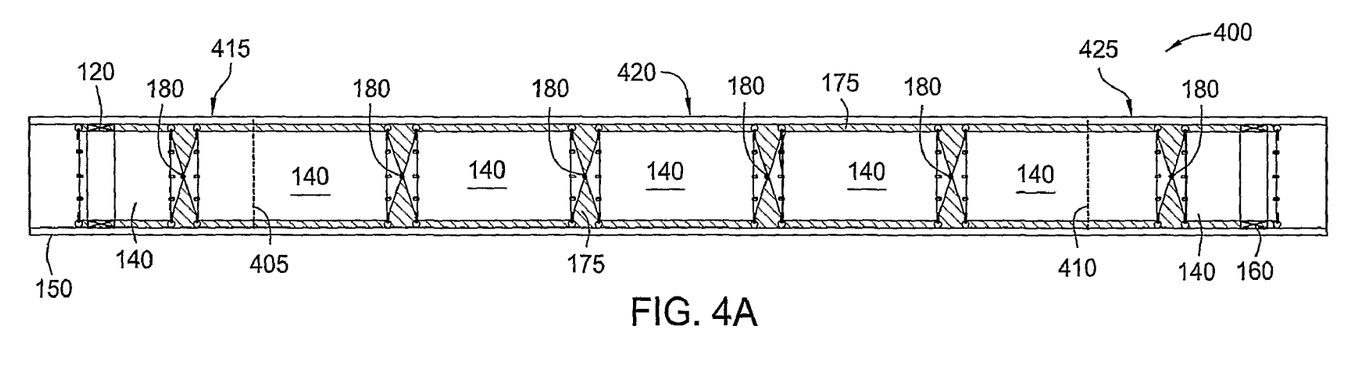
FIG. 4A shows a schematic illustration of a longer tool 400 capable of spanning two or more pipe welds connecting two or more sections of pipe.

FIG. 4A shows a schematic illustration of a longer tool 400 capable of spanning two or more pipe welds connecting two or more sections of pipe. FIG. 4 shows two pipe welds 405, 410 that connect three sections of pipe 415, 420, 425. The tool 400 can include a plurality of bodies 140 connected to one another, and located between the first and second seal assemblies 120, 160, as shown in FIG. 4. The individual bodies 140 are preferably connected to one another using any one kind or any combination of the flexible connectors 180. Since the tool 400 is likely to be required to articulate (i.e. twist and/or turn) through one or more pipe bends, the tool 400 can include one or more flexible connectors 180 between each individual body 140 or between certain groups of bodies 140 that are coupled to one another.

Figure 4B:
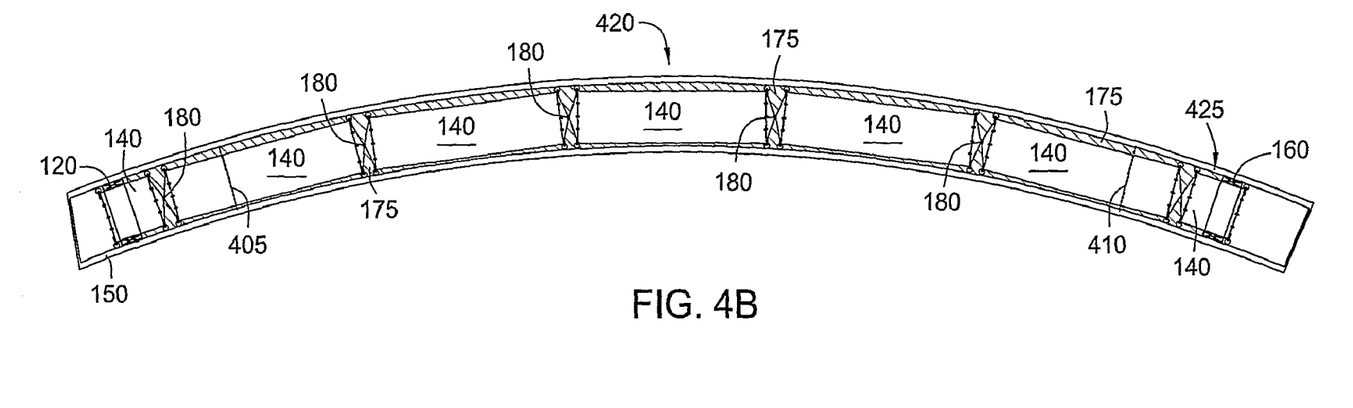
FIG. 4B shows a schematic illustration of the longer tool 400 of FIG. 4A disposed within a curved section of pipeline.
Figure 4C:
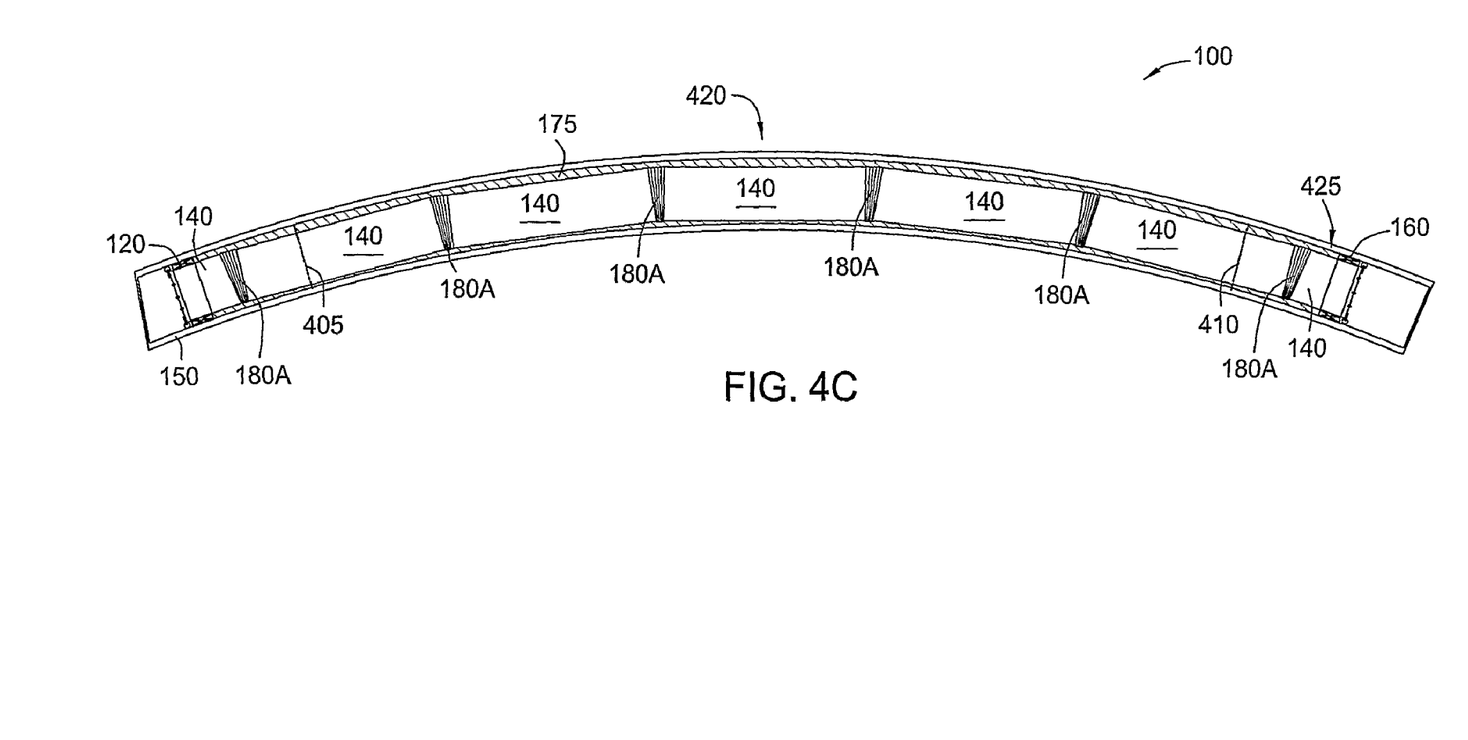
FIG. 4C shows a schematic illustration of the longer tool 400 of FIG. 4A disposed within a curved section of pipeline, where the longer 400 utilizes an accordion-type connector shown in FIG. 1B.

FIGS. 4B and 4C show a schematic illustration of the tool 400 of FIG. 4A disposed within a curved section of pipeline. FIG. 4C shows a schematic illustration of the longer tool 400 of FIG. 4A disposed within a curved section of pipeline, where the longer 400 utilizes the accordion-type connector 180A shown in FIG. 1B. Referring to FIGS. 4B and 4C, the tool 400 can include two or more bodies 140 of the same or various lengths and/or the same or various outer diameters that are physically connected. For example, the tool 400 can include as much as fifteen individual bodies 140 that range in length between four and ten feet. Alternatively, the tool 400 can include two or more groups of 2, 3, 4, 5, 6, 7, 8, 9, or 10 bodies. The number and spacing of the flexible connectors 180 can depend on the pipeline geometry, such as bend radius and internal diameter, the tool 400 outside diameter, and the overall length of the tool 400.

In operation, the tool 100, 400 is inserted within a section of pipeline to be tested. The tool 100 or 400 can be inserted into a pipeline that is buried (i.e. below ground) or above ground. After insertion of the tool 100, 400 into the pipeline, the pipeline can be tested above ground or below ground. The tool 100, 400 is then located within one or more sections of the pipeline to be tested. Preferably, the tool 100 or 400 is located within the pipeline such that the seal assemblies 120, 160 are located on either side of the one or more welds to be tested. The seal assemblies 120, 160 are then actuated to form a high pressure seal or mechanical seal with the inner wall of the pipe. A test fluid, such as water or air is pumped into the test volume 175 and pressurized. The pressurized fluid is maintained at a pressure at least 25% more than the intended operating pressure of the pipeline. The pressurized fluid is held for up to 36 hours, such as at least 1 minute, at least 5 minutes, at least 10 minutes, at least 30 minutes, at least 1 hour, at least 2 hours, at least 5 hours, at least 10 hours, at least 15 hours, at least 20 hours, or at least 24 hours, until the testing procedures are met. For example, the pressurized fluid can be held from about 1 minute to about 8 hours, or from 5 minutes to about 1 hour, or from about 5 minutes to about 30 minutes, or from about 5 minutes to about 10 minutes.

Afterward, the seal assemblies 120, 160 are deactuated to release the seal formed with the wall of the pipe, and the tool 100, 400 is located to another location within the pipeline to be tested. As explained above, the tool 100 or 400 can pressure test short segments of pipe one at a time. If a pressure drop is detected, the source of the leak can be pinpointed immediately, saving time to locate the leak and saving time and money in the retest. In the event of a rupture or pipe failure, the rupture will release a small volume of liquid to the environment, as opposed to a long section of pipe filled with a large volume of pressure test fluid.

Controls can be provided to the tool 100, 400 using a tethered or untethered system. Such a system can be operated autonomously or through continuous wireless controls sent from the operator outside the pipeline. Illustrative controls include but are not limited to power, chemicals, hydraulics, data, communications, test fluid and any combination or permutation thereof.

A tethered system can allow passage of controls to the tools 100, 400 via an umbilical from a base station. The base station can be a truck located at grade near the pipeline or the base station can be a train of one or more systems vessels that follow the tools 100, 400 within the pipeline. The tethered umbilical can be armored for protection and to withstand appropriate tension forces under towing. To armor a cable, a protective hard sheath can be wrapped around the internal components. Alternatively, two or more layers of wire strand rope can be wrapped in an opposing helical direction around the core conduit.

In one or more embodiments, the tool 100, 400 can be located or moved within the pipeline using a tow line connected to the tool 100, 400. The tow line can be connected to equipment at the surface. Alternatively, the tow line can be connected to a motion device within the pipeline. Exemplary motion devices are mentioned above. In one or more embodiments, the tool 100, 400 can be directly linked to a motion device or indirectly linked to a motion device through one or more self-contained systems arranged in series and located within the pipeline with the tool 100, 400. Such self-contained systems can include one or more of a controls and motion device, a fluid compressor, a fluid storage tank, a power generator, a fuel tank, and any other system required by the tool 100, 400 to perform its intended operation.

In one or more embodiments, the tool 100, 400 can have a length of about 50 feet, use air or water as the test fluid, have its controls tethered or untethered and be inserted into a buried pipeline to be tested or inserted into an above ground pipeline to be tested. For example, the tool 100, 400 have a length of about 50 feet, use water as the test fluid, have tethered controls and be inserted into a buried pipeline for testing.

In one or more embodiments, the tool 100, 400 can have a length of about 5 feet, use air or water as the test fluid, have its controls tethered or untethered and be inserted into a buried pipeline to be tested or inserted into an above ground pipeline to be tested. For example, the tool 100, 400 have a length of about 5 feet, use water as the test fluid, have tethered controls and be inserted into a buried pipeline for testing. In another specific example, the tool 100, 400 have a length of about 5 feet, use water as the test fluid, have untethered controls and be inserted into a buried pipeline for testing.

Figure 5:
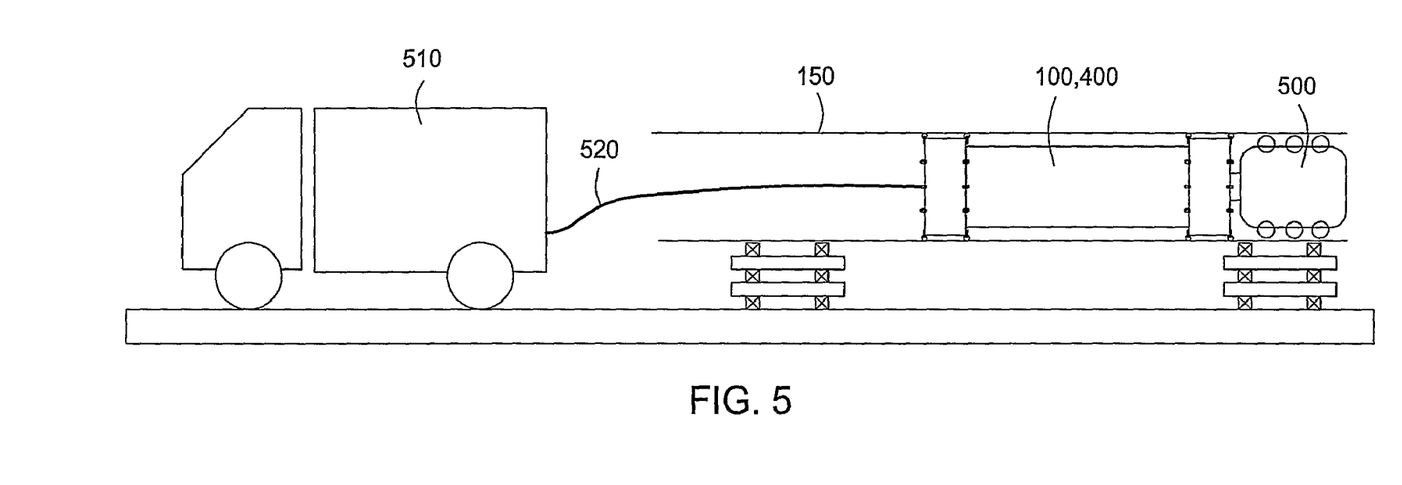
FIG. 5 shows a schematic illustration of a tethered system within an above ground pipeline (i.e. "pre-buried" pipeline) 150 to be tested.

FIG. 5 shows a schematic illustration of a tethered system within an above ground pipeline 150 (e.g. an above ground constructed pipeline that will be buried in the future) to be tested. In one or more embodiments, the tool 100, 400 is coupled to a motion device 500 at a first end thereof, and coupled to a base station such as a truck 510 via an umbilical 520 at a second end thereof. The motion device 500 locates the tool 100, 400 within the pipeline 150. Motion devices are well known in the art and any suitable motion device can be used, including one or more pipeline tractors or crawlers. A suitable pipeline tractor can be obtained from Baker Hughes, for example.

Figure 6:
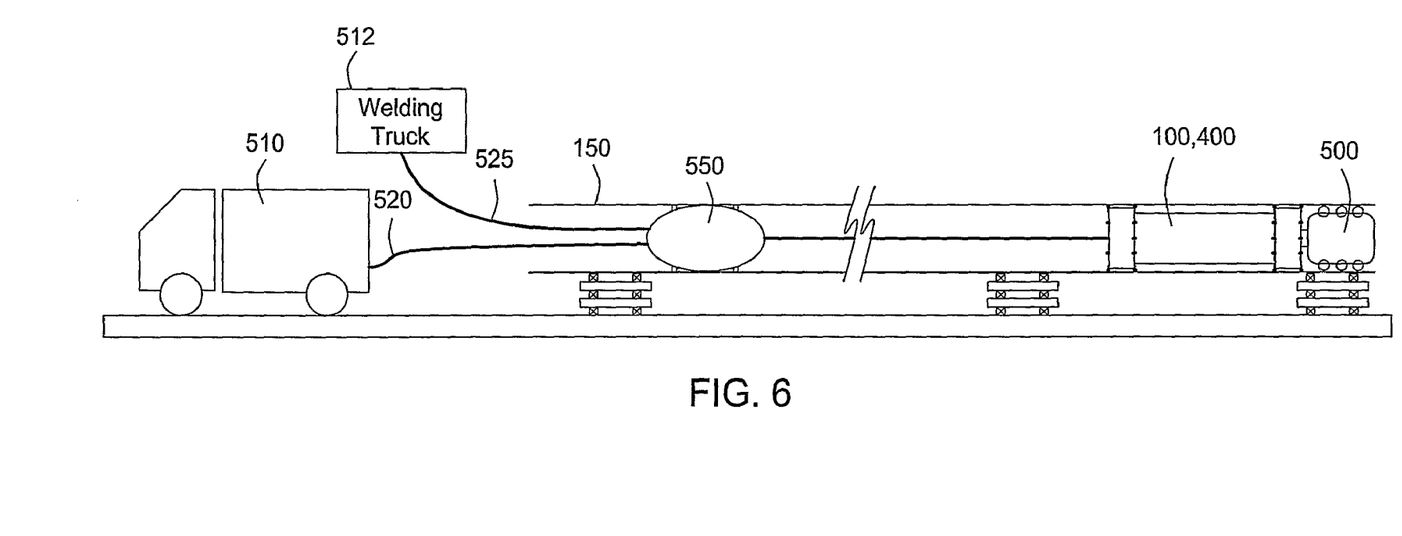
FIG. 6 shows another schematic illustration of a tethered system within an above ground pipeline to be tested.

FIG. 6 shows another schematic illustration of a tethered system within an above ground pipeline (i.e., pre buried" pipeline) to be tested. In one or more embodiments, the tool 100, 400 is coupled to the motion device 500 at a first end thereof, and coupled to an internal welding system 550 via an umbilical 520 at a second end thereof. The welding system 550 is then connected to a base station welding system such as the welding truck 512 via an umbilical 525. In this embodiment, the tool 100 or 400 is connected in series (i.e., "daisy-chained") behind the internal welding system 550. The length between the welding system 550 and the tool 100, 400 should be sufficient to accomplish all the other tasks of pipeline construction after internal welding and before pressure testing, such as external welding, non-destructive testing, insulation and coating, for example. As such, the pressure test tool 100, 400 can perform its operations substantially at the same rate as the internal welder, as to advance from one pipe joint to the next. In one or more embodiments, the length between the welding system 550 and the tool 100, 400 can be greater than 50 feet, greater than 100 feet, or greater than 150 feet. Preferably, the length is between 50 feet and 120 feet.

Figure 7:
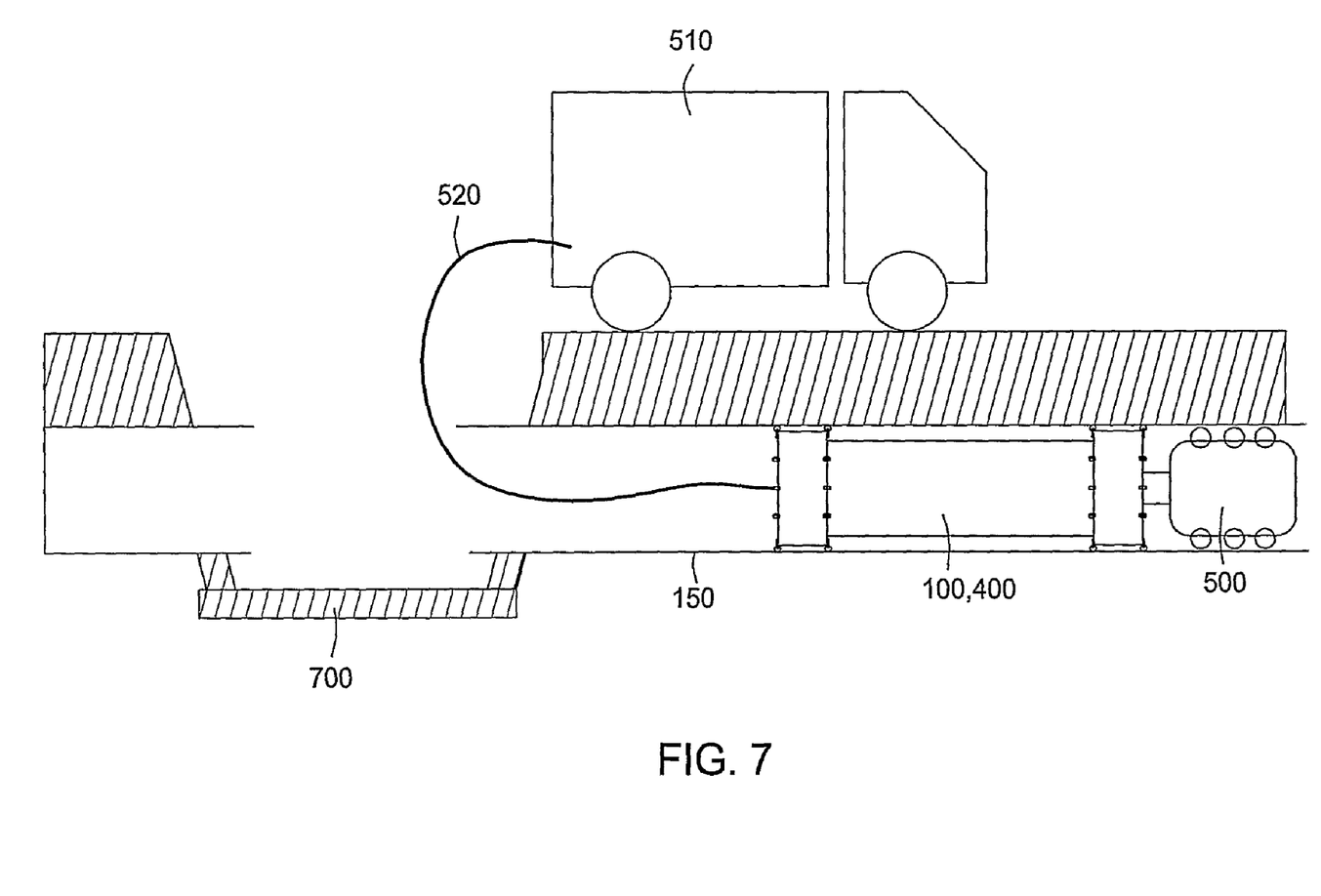
FIG. 7 shows a schematic illustration of a tethered system for testing a buried pipeline.

FIG. 7 shows a schematic illustration of a tethered system for testing a pipeline 150. The tool 100, 400 can be coupled to a motion device 500 at a first end thereof, and coupled to a base station such as a truck 510 via an umbilical 520 at a second end thereof. Preferably, the truck 510 is located near a "bell hole" where sections of pipeline are to be joined. The umbilical 520, tool 100, 400, and motion device 500 can be inserted into the pipeline 150 to be tested at the location the bell hole. Once the pressure testing of the pipeline 150 is completed, the umbilical 520, tool 100, 400, and motion device 500 can be retracted through the end of the pipeline 150 that is accessible through the bell hole. The entire assembly can then be driven to next bell hole location to test a new section of pipeline.

Figure 8:
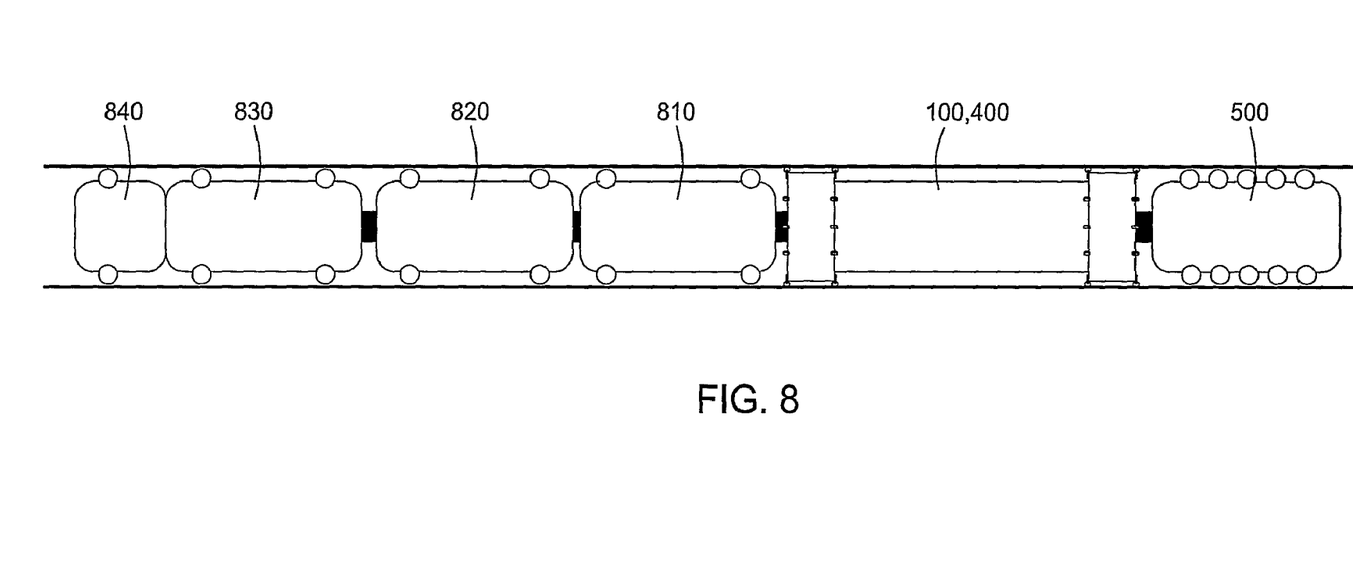
FIG. 8 shows a schematic illustration of an untethered system for testing a pipeline.

FIG. 8 shows a schematic illustration of an untethered system for testing a pipeline. In one or more embodiments, the tool 100, 400 is connected to a train of one or more self-contained systems. The self-contained systems can include one or more of a controls and motion device 800, a fluid compressor 810, a fluid storage tank 820, a power generator 830, and a fuel tank 840. The controls and motion device 800 can include one or more microprocessors to provide a wireless data link to and from a computer located on the surface, such as the truck 510 discussed above. The fluid compressor 810 generates and provides the pressurized test fluid needed for the testing. The fluid storage tank 820 provides a reservoir for the test fluid.

Since test fluid may be lost during testing if a leak is encountered, the fluid storage tank 820 can provide additional test fluid so the tool 100, 400 can continue to test a different weld or welds without having to pull the tool 100, 400 from the pipeline 150. The power generation 830 can be a battery or alternative source of power such as a fuel driven generator to provide power to the motion device 800. The fuel tank 840 can contain a sufficient amount of fuel needed to operate the power generator, the fluid compressor 810 and/or the motion device 800 during the duration of the pressure test. Preferably, enough fuel is provided to test a multitude of welds before refueling.

Various specific embodiments are described below, at least some of which are also recited in the claims. For example, at least one specific embodiment is directed to a tool that includes a first high pressure seal and a second high pressure seal adapted to isolate a test volume located within a section of the pipeline between the first and second high pressure seals. The tool also includes at least one flexible member connecting the first high pressure seal to the second high pressure seal, the at least one flexible member adapted to permit movement of the first high pressure seal relative to the second high pressure seal, allowing the tool to travel through a curvature in the pipeline.

In at least one other specific embodiment, a tool includes a first high pressure seal and a second high pressure seal adapted to isolate a test volume located within a section of the pipeline between the first and second high pressure seals; and at least one articulating member connecting the first high pressure seal to the second high pressure seal, the at least one articulating member adapted to permit movement of the first high pressure seal relative to the second high pressure seal, allowing the tool to travel through a curvature in the pipeline.

In yet another specific embodiment, a tool includes a first mechanical seal and a second mechanical seal adapted to isolate a test volume located within a section of the pipeline between the first and second mechanical seals; and at least one flexible member connecting the first mechanical seal to the second mechanical seal, the at least one flexible member adapted to permit movement of the first mechanical seal relative to the second mechanical seal, allowing the tool to travel through a curvature in the pipeline.

In yet another specific embodiment, a tool includes a flexible tubular for inserting into an inner diameter of a pipeline to be tested. The flexible tubular member has a first end axially disposed from a second end. The tool also includes a first mechanical seal disposed about the first end for engaging an inner diameter of the pipeline at a first location. The tool further includes a second mechanical seal disposed about the second end for engaging the inner diameter of the pipeline at a second location. A test volume is defined about an outer diameter of the flexible tubular member, between the first and second mechanical seals.

In one or more of the tools identified above, or elsewhere herein, the first high pressure seal and second high pressure seal are mechanically actuated.

In one or more of the tools identified above, or elsewhere herein, the flexible member is an articulating member.

In one or more of the tools identified above, or elsewhere herein, the high pressure seals each comprise a material sufficient to withstand a differential pressure of at least 200 psig.

In one or more of the tools identified above, or elsewhere herein, the high pressure seals each comprise at least one mechanically actuated component.

In one or more of the tools identified above, or elsewhere herein, the first and second high pressure seals are adapted to isolate a fluid across a pressure difference of at least 300 psi, or at least 400 psi, at least 450 psi, or at least 500 psi.

In one or more of the tools identified above, or elsewhere herein, the tool further comprises a mechanical propulsion port suitable for linkage to a mechanical propulsion device adapted to propel the tool through the pipeline.

In one or more of the tools identified above, or elsewhere herein, the mechanical propulsion port is suitable for accepting a force to push the tool through the pipeline, accepting a force to drag the tool through the pipeline, or both.

In one or more of the tools identified above, or elsewhere herein, the mechanical propulsion port includes one or more of a hitch, a ball-and-socket joint, a universal joint, or a drive shaft fitting.

In one or more of the tools identified above, or elsewhere herein, the test volume is an annulus occupying less than about 20% of a volume within the section of pipeline between the first and second high pressure seals. In one or more embodiments, the test volume occupies less than 50%, or 40%, or 30%, or 35%, or 25% of the volume within the section of pipeline between the first and second high pressure seals.

In one or more of the tools identified above, or elsewhere herein, the flexible member comprises an articulating connection adapted to position the first and second high pressure seals substantially perpendicular to a centerline of the pipeline section whether the pipeline section is substantially straight or bending.

In one or more of the tools identified above, or elsewhere herein, the flexible member comprises one or more corrugated sections of tubing.

In one or more of the tools identified above, or elsewhere herein, the tool further includes a fluid conduit suitable for transporting a test fluid from a supply location to the test volume.

In one or more of the tools identified above, or elsewhere herein, the fluid conduit is suitable for transporting a liquid, a gas, or combinations thereof.

In one or more of the tools identified above, or elsewhere herein, the distance between the first high pressure seal and the second high pressure seal is less than 100 feet, or less than 80 feet, or less than 70 feet, or less than 60 feet, or less than 50 feet, or less than 45 feet, or less than 40 feet, or less than 30 feet, or less than 20 feet, or less than 10 feet.

In one or more of the tools identified above, or elsewhere herein, the tool further includes one or more umbilical ports.

In one or more of the tools identified above, or elsewhere herein, the umbilical port includes a connection for one or more of electrical power, chemical injection, hydraulic force, electronic data, electronic communication, or a test fluid.

In one or more of the tools identified above, or elsewhere herein, the articulating member is adapted to position the first and second high pressure seals substantially perpendicular to a centerline of the pipeline section whether the pipeline section is substantially straight or bending In one or more of the tools identified above, or elsewhere herein, the tool further includes a flexible member disposed between the first and second high pressure seals, the flexible member connected to the first high pressure seal at a first end thereof using a first articulating member and connected to second high pressure seal at a second end thereof using a second articulating member.

In one or more of the tools identified above, or elsewhere herein, the flexible member is a flexible tubular or a corrugated tubular.

In one or more of the tools identified above, or elsewhere herein, the first and second mechanical seals each include the following: an annular sealing member having first and second sloped surfaces, wherein the sloped surfaces are angled from an inner diameter of the annular sealing member toward an outer diameter of the annular sealing member; a housing member having a first end at least partially sloped to complement at least one of the sloped surfaces of the annular member; a cone having a sloped end corresponding to the other sloped surface of the annular member; and at least one actuating member connected to the cone and adapted to axially move the sloped end of the cone toward the sloped end of the housing member, thereby axially compressing and radially expanding the sealing member to engage the inner diameter of the pipeline.

In one or more of the tools identified above, or elsewhere herein, the actuating member is disposed within the housing member.

In one or more of the tools identified above, or elsewhere herein, the first and second mechanical seals each include the following: a housing member; a sealing member at least partially disposed about an outer diameter of the housing member, and at least one actuating member connected to the second section of the housing member, the actuating member is adapted to axially move the second section of the housing member toward the first section of the housing member, thereby axially compressing and radially expanding the sealing member to engage the inner diameter of the pipeline.

In one or more of the tools identified above, or elsewhere herein, the sealing member includes the following: a first and second sloped surface wherein each sloped surface is angled from an inner diameter of the sealing member toward an outer diameter of the sealing member; and the housing member comprises a first section having an at least partially sloped end to complement at least one of the sloped surfaces of the sealing member, and a second section having an at least partially sloped end to complement the other sloped surface of the sealing member.

In one or more of the tools identified above, or elsewhere herein, the first and second mechanical seals each include the following: a support ring having a first end thereof that is at least partially sloped; a cone having a first end thereof that is at least partially sloped, wherein the at least partially sloped ends of the support ring and the cone are disposed opposite one another; and a sealing member disposed between the sloped ends of the support ring and the cone; and an actuating member connected to the cone to axially move the cone toward the support ring thereby axially compressing and radially expanding the sealing member to engage the inner diameter of the pipeline.

In one or more of the tools identified above, or elsewhere herein, the tool further includes at least one articulating member connecting the first mechanical seal to the flexible member. The at least one articulating member is adapted to permit movement of the first mechanical seal relative to the second mechanical seal, allowing the tool to travel through a curvature in the pipeline.

In one or more of the tools identified above, or elsewhere herein, the tool further includes at least one articulating member connecting the second mechanical seal to the flexible tubular. The at least one articulating member is adapted to permit movement of the second mechanical seal relative to the flexible tubular and the first mechanical seal, allowing the tool to travel through a curvature in the pipeline.

In one or more of the tools identified above, or elsewhere herein, the actuating member comprises a piston.

In one or more of the tools identified above, or elsewhere herein, the actuating member comprises a piston that is fluid operated.

In one or more of the tools identified above, or elsewhere herein, the actuating member comprises a piston that is hydraulically or pneumatically actuated.

In one or more of the tools identified above, or elsewhere herein, the actuating member comprises a piston that is electrically actuated.

In one or more of the tools identified above, or elsewhere herein, the test volume is an annulus.

In at least one specific embodiment, a method includes positioning a first high pressure seal inside a pipeline at a first location and positioning a second high pressure seal inside the pipeline at a second location, thereby providing a test volume between the first and second seals. The test volume is pressurized thereby providing a pressure difference of 200 psig or greater across at least one of the first high pressure seal, the second high pressure seal or both. Within eight hours of the completion of the positioning step, the first high pressure seal is repositioned at a third location, the second high pressure seal is repositioned at a fourth location, and a second test volume is pressurized between the first and second seals.

In one or more of the methods identified above, or elsewhere herein a pipeline weld to be tested is disposed between the first and second high pressure seals.

In one or more of the methods identified above, or elsewhere herein, the first and second high pressure seals are repositioned after about 1 hour of the positioning step.

In one or more of the methods identified above, or elsewhere herein, the pressure difference is at least 200 psi across at least one of the first high pressure seal, the second high pressure seal or both. In one or more embodiments, the pressure difference is at least 200 psi, or at least 300 psi, or at least 350 psi or at least 400 psi or at least 450 psi.

In one or more of the methods identified above, or elsewhere herein, the test volume is pressurized with a fluid comprising one or more liquids provided from a conduit in communication with the test volume at a first end thereof and a reservoir at a second end thereof.

In one or more of the methods identified above, or elsewhere herein, the reservoir is coupled to one of the first or second high pressure seals and is disposed within the pipeline.

In one or more of the methods identified above, or elsewhere herein, the test volume is pressurized with a fluid comprising one or more gases provided from a conduit in communication with the test volume at a first end thereof and a reservoir at a second end thereof.

In one or more of the methods identified above, or elsewhere herein, the reservoir is coupled to one of the first or second high pressure seals and is disposed within the pipeline.

In one or more of the methods identified above, or elsewhere herein, the method further includes removing at least a portion of the fluid before the repositioning step.

In one or more of the methods identified above, or elsewhere herein, the method further includes removing at least a portion of the fluid before the repositioning step.

In one or more of the methods identified above, or elsewhere herein, the method further includes relieving at least a portion of the pressure before the repositioning step.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

Various terms have been defined above. To the extent a term used in a claim is not defined above, it should be given the broadest definition persons in the pertinent art have given that term as reflected in at least one printed publication or issued patent. Certain embodiments and features have also been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for pressure testing a pipeline, comprising:
    one or more umbilical ports;
    a first high pressure seal and a second high pressure seal adapted to isolate a test volume located within a section of the pipeline between the first and second high pressure seals; and
    at least one flexible member connecting the first high pressure seal to the second high pressure seal, the at least one flexible member adapted to permit movement of the first high pressure seal relative to the second high pressure seal, allowing the apparatus to travel through a curvature in the pipeline.

2. The apparatus of claim 1, wherein the first high pressure seal and second high pressure seal are mechanically actuated.

3. The apparatus of claim 1, wherein the flexible member is an articulating member.

4. The apparatus of claim 1, wherein the high pressure seals each comprise a material sufficient to withstand a differential pressure of at least 200 psi.

5. The apparatus of claim 1, wherein the high pressure seals each comprise at least one mechanically actuated component.

6. The apparatus of claim 1, wherein the first and second high pressure seals are adapted to isolate a fluid across a pressure difference of at least 300 psi.

7. The apparatus of claim 1, wherein the first and second high pressure seals are adapted to isolate a fluid across a pressure difference of at least 500 psi.

8. The apparatus of claim 1, further comprising a mechanical propulsion port suitable for linkage to a mechanical propulsion device adapted to propel the apparatus through the pipeline.

9. The apparatus of claim 8, wherein the mechanical propulsion port is suitable for accepting a force to push the apparatus through the pipeline, accepting a force to drag the apparatus through the pipeline, or both.

10. The apparatus of claim 8, wherein the mechanical propulsion port includes one or more of a hitch, a ball-and-socket joint, a universal joint, or a drive shaft fitting.

11. The apparatus of claim 1, wherein the test volume is an annulus occupying less than about 20% of a volume within the section of pipeline between the first and second high pressure seals.

12. The apparatus of claim 1, wherein the flexible member comprises an articulating connection adapted to position the first and second high pressure seals substantially perpendicular to a centerline of the pipeline section whether the pipeline section is substantially straight or bending.

13. The apparatus of claim 1, wherein the flexible member comprises one or more corrugated sections of tubing.

14. The apparatus of claim 1, further including a fluid conduit suitable for transporting a test fluid from a supply location to the test volume.

15. The apparatus of claim 14, wherein the fluid conduit is suitable for transporting a liquid, a gas, or combinations thereof.

16. The apparatus of claim 1, wherein the distance between the first high pressure seal and the second high pressure seal is less than 100 feet.

17. The apparatus of claim 1, wherein the distance between the first high pressure seal and the second high pressure seal is less than 60 feet.

18. The apparatus of claim 1, wherein the distance between the first high pressure seal and the second high pressure seal is less than 10 feet.

19. The apparatus of claim 1, wherein the umbilical port includes a connection for one or more of electrical power, chemical injection, hydraulic force, electronic data, electronic communication, or a test fluid.

20. An apparatus for pressure testing a pipeline, comprising:
    one or more umbilical ports;
    a first high pressure seal and a second high pressure seal adapted to isolate a test volume located within a section of the pipeline between the first and second high pressure seals; and
    at least one articulating member connecting the first high pressure seal to the second high pressure seal, the at least one articulating member adapted to permit movement of the first high pressure seal relative to the second high pressure seal, allowing the apparatus to travel through a curvature in the pipeline.

21. The apparatus of claim 20, wherein the first high pressure seal and second high pressure seal are mechanically actuated.

22. The apparatus of claim 20, wherein the high pressure seals each comprise a material sufficient to withstand a differential pressure of at least 200 psi.

23. The apparatus of claim 20, wherein the high pressure seals each comprise at least one mechanically actuated component.

24. The apparatus of claim 20, wherein the first and second high pressure seals are adapted to isolate a fluid across a pressure difference of at least 300 psi.

25. The apparatus of claim 20, wherein the first and second high pressure seals are adapted to isolate a fluid across a pressure difference of at least 500 psi.

26. The apparatus of claim 20, further comprising a mechanical propulsion port, suitable for linkage to a mechanical propulsion device adapted to propel the apparatus through the pipeline.

27. The apparatus of claim 26, wherein the mechanical propulsion port is suitable for accepting a force to push the apparatus through the pipeline, accepting a force to drag the apparatus through the pipeline, or both.

28. The apparatus of claim 26, wherein the mechanical propulsion port includes one or more of a hitch, a ball-and-socket joint, a universal joint, or a drive shaft fitting.

29. The apparatus of claim 20, wherein the test volume is an annulus occupying less than about 20% of a volume within the section of pipeline between the first and second high pressure seals.

30. The apparatus of claim 20, wherein the articulating member is adapted to position the first and second high pressure seals substantially perpendicular to a centerline of the pipeline section whether the pipeline section is substantially straight or bending.

31. The apparatus of claim 20, wherein the articulating member includes one or more of a ball-and-socket joint or a universal joint.

32. The apparatus of claim 20, further comprising a flexible member disposed between the first and second high pressure seals.

33. The apparatus of claim 20, further comprising a flexible member disposed between the first and second high pressure seals, the flexible member connected to the first high pressure seal at a first end thereof using a first articulating member and connected to second high pressure seal at a second end thereof using a second articulating member.

34. The apparatus of claim 20, further including a fluid conduit suitable for transporting a test fluid from a supply location to the test volume.

35. The apparatus of claim 34, wherein the fluid conduit is suitable for transporting a liquid, a gas, or combinations thereof.

36. The apparatus of claim 20, wherein the distance between the first high pressure seal and the second high pressure seal is less than 100 feet.

37. The apparatus of claim 20, wherein the distance between the first high pressure seal and the second high pressure seal is less than 60 feet.

38. The apparatus of claim 20, wherein the distance between the first high pressure seal and the second high pressure seal is less than 10 feet.

39. The apparatus of claim 20, wherein the umbilical port includes a connection for one or more of electrical power, chemical injection, hydraulic force, electronic data, electronic communication, or a test fluid.

* * * * *